Patented July 24, 1951

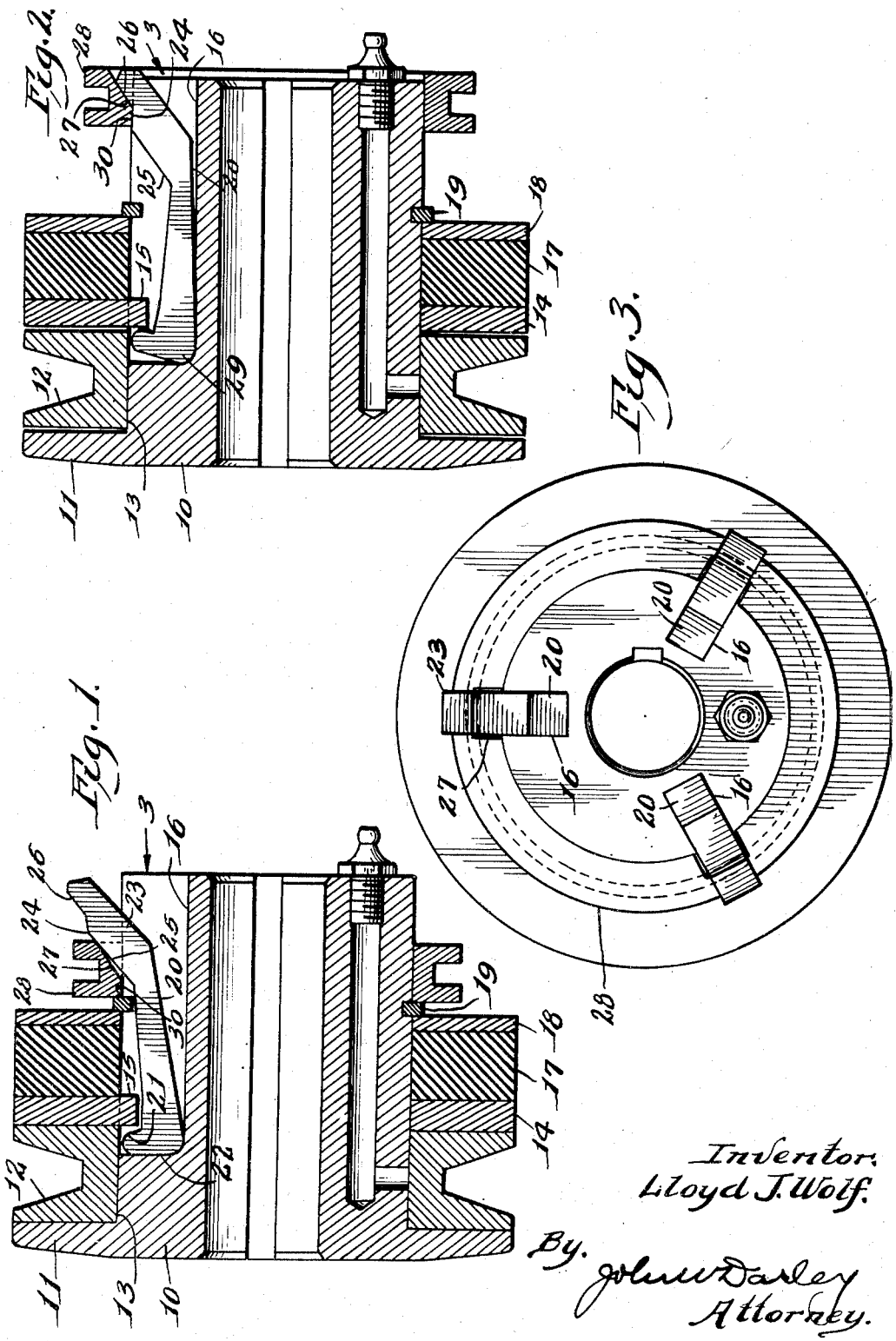

2,561,833

UNITED STATES PATENT OFFICE 2,561,833

CAM RELEASED CLUTCH

Lloyd J. Wolf, Racine, Wis., assignor to Twin Disc Clutch Company, Racine, Wis., a corporation of Wisconsin Application June 12, 1948, Serial No. 32,664

5 Claims. (Cl. 192—68)

My invention relates to clutches and is concerned more particularly with a design therefor which is characterized by low manufacturing cost, ease of assembly, and the elimination of parts ordinarily considered necessary for efficient operation.

One object of the invention is to provide a clutch which is resiliently loaded by an annular, elastic member, such as a rubber ring, that insures uniform pressure throughout the friction surfaces of the clutch.

A further object is to devise a clutch of the character indicated in which the release mechanism includes clutch fingers that are arranged for a floating or wandering action, as distinguished from a fixed pivot, and which are shaped to insure their being held in the release position by the expanding pressure of the loading ring.

A further object is to provide a resiliently loaded clutch in which the fingers forming part of the release mechanism additionally interlock with the actuating collar to prevent relative rotation thereof and also act as stops to limit releasing movement of the collar.

A further object is a reduction in manufacturing cost through die casting certain members of the clutch which include the friction surfaces and chromium plating some of these members for durability and protection of the associated parts against heat created during operation.

These and further objects of the invention will be set forth in the following specification, reference being had to the accompanying drawing, and the novel means by which said objects are effectuated will be definitely pointed out in the claims.

In the drawing.

Figs. 1 and 2 are sectional elevations of the clutch in engaged and released positions, respectively.

Fig. 3 is an end view of the clutch looking in the direction of the arrow 3 in Fig. 1.

Referring to the drawing, the numeral 10 designates a hub which is internally keyed or splined for engagement with a shaft (not shown) that may be a driving or a driven member and which includes an integral, annular flange that serves as the back or abutment plate 11 of the clutch. A V-belt pulley 12 is freely journaled on the hub portion 13 in juxtaposition to the plate 11 and acts as a driving or a driven member.

The opposite radial surfaces of the pulley 12 constitute friction surfaces of the clutch which coact, respectively, with the adjacent surface of the plate 11 and one side of a pressure plate 14 which is internally toothed as at 15 in a plurality of locations for rotating engagement with a plurality of longitudinally disposed keyways 16 provided in the periphery of the hub 10, the left end of each keyway extending from the right end of the hub to just beyond the pressure plate 15 in all axial positions of the latter, but terminating short of the left end of the hub. Three such keyways are illustrated in Fig. 3, but the number may be varied as desired. It will be understood that the pulley 12 may be replaced by other members for transmitting power to or from the hub 10, such as, for example, a plate which is peripherally toothed for driving or driven engagement with an internally toothed ring in accordance with standard clutch practice.

The loading pressure for the clutch is supplied by a rubber ring 17 which is compressed between the pressure plate 14 and a backing plate 18 which is restrained against movement away from the pressure plate by a split, snap ring 19 which is recessed in the periphery of the hub 10. The backing plate therefore provides a fixed base for the extending action of the rubber ring 17 which, in the driving position of the clutch parts, applies uniform annular pressure against the pressure plate 15 that in turn grips the pulley 12 against the abutment plate 11.

To release the clutch, the following instrumentalities are employed. An elongated, release finger 20 is mounted for relatively free rocking movement in each of the keyways 16 and the left end of each finger includes a radially outward nose 21 which at all times is positioned between the associated pressure plate tooth 15 and the end wall 22 of the keyway 16. The spacing of this tooth and wall is always less than the width of the nose 21 so that the latter does not hinder the movement of the pressure plate 14 to driving position and the nose end of the finger 20 may be rocked in the keyway 16 during release of the clutch.

The right end of the finger 20 includes a portion 23 which angles outwardly of the keyway 16 and away from the backing plate 18 in the position of parts shown in Fig. 1. The outer profile of the finger portion 23 is irregular and is defined by an intermediate cam surface 24 and inner and outer cam surfaces 25 and 26, respectively. The surface 24 is less inclined with respect to the axis of the clutch than are the surfaces 25 and 26 for a purpose presently explained and, in the driving position of the clutch as shown in Fig. 1, the surface 25 is received within a slot 27 cut partially through a shifting collar 28 and registering with the associated keyway 16. The base of the slot 27 may conform generally to the surface 25 or may be slightly inclined relative thereto as shown in Fig. 1 and the collar 28 may be shifted by the usual fork (not shown), or other means, as is well understood in the clutch art.

In the operation of the clutch, and considering Fig. 1, the extending action of the compressed rubber ring 17 applies pressure uniformly around the pressure plate 14 and thence to the friction surfaces, thus establishing power transmitting capacity between the hub 10 and pulley 12. During power transmission, the finger 20 is maintained in the position shown by centrifugal force and if power flow should be interrupted and the clutch ceases rotation in the engaged position, any finger that may be in a position to be gravity dropped radially inward of its associated keyway is prevented from moving sufficiently to entirely disengage from the slot 27 by the nose 21 contacting the pressure plate 15.

The clutch is disengaged by moving the shifting collar 28 towards the right to the position illustrated in Fig. 2. During this movement, the bases of the collar slots 27 ride along the cam surfaces 25, rocking the clutch fingers 20 inwardly of the keyways 16 and causing the noses 21 to bear against the pressure plate teeth 15. The fulcrum for each finger during this movement is provided by the wall 22 against which bears the left extremity of the finger radially inward of the nose 21, denoted by the numeral 29, and the result of the movement, as shown in Fig. 2, is to move the pressure plate 14 towards the right, further compressing the rubber ring 17 and freeing the friction surfaces of the pressure theretofore exerted by the latter ring.

The releasing movement of the collar 28 is limited by engagement of the bases of the slots 27 with the cam surfaces 26 which act as stops and, in this position of parts, the intermediate surfaces 24 are substantially parallel to and bear against those parts of the inner, annular surface of the collar 28 which register with the keyways 16, these parts being denoted by the numeral 30. Hence, the extending force of the rubber ring 17 in the release position is transmitted through the clutch fingers 20 and radially outward against the collar surface 30 through the finger surfaces 24, these surfaces being substantially parallel to the clutch axis and thus maintaining the collar 28 in the release position and obviating any extraneous factors for accomplishing this result.

An important advantage of the above construction is the fact that the fingers 20 not only perform their primary function as releasing agents, but also serve as keys for preventing rotation of the collar 28 relative to the hub 10 and as stops for this collar, thereby eliminating the necessity for additional keys and stop elements for these purposes. These design features are reflected in obvious manufacturing advantages in that they materially reduce costs.

The clutch is compact, simple in construction, and is easy to assemble since the parts may be mounted on the hub in an obvious manner and the rubber ring 17 is then compressed sufficiently to permit the snap ring 19 to be seated in position, thus establishing sufficient initial compression in the ring 17 to effect the desired engagement of the friction surfaces.

As a further means of reducing costs, the hub 10, including its integral abutment plate 11, and the pulley 12 are die cast out of a suitable material, which may be those having a zinc or an aluminum base, or any alloy which is commonly used for die casting. This method eliminates considerable machining since the indicated parts may be cast to close tolerances. For durability and to secure the effect of dissimilar surfaces between the pulley and the hub, the outer surfaces of the hub, including the abutment plate 11 and the keyways 16, have applied thereto a hard plating of chromium.

I claim:

1. In a clutch, the combination of a hub having an annular flange constituting a friction element, a friction member journaled on the hub in coacting relation to the element, an annular, pressure plate connected to the hub and shiftable to frictionally grip the member against the element, an annular, backing plate on the hub spaced and held against axial movement away from the pressure plate, a rubber ring compressed between the plates and acting to shift the pressure plate to gripping position, a collar slidable on the hub, and release fingers actuated by the collar and engageable with the pressure plate for further compressing the rubber ring and releasing the member, the fingers being positioned around the hub within the collar and one end of each finger extending through the pressure plate to engage the gripping side thereof.

2. In a clutch, the combination of a hub having longitudinal keyways spaced around and opening radially outward thereof and an annular friction member, a second friction member journaled on the hub in coacting relation to the annular member, an annular, pressure plate having teeth fitting into the keyways and shiftable to frictionally grip the members, an annular backing plate on the hub spaced and held against axial movement away from the pressure plate, a rubber ring compressed between the plates and acting to shift the pressure plate to gripping position, and means for releasing the members comprising a release finger rockable in each keyway and having one end engageable with the adjacent pressure plate tooth in a direction to further compress the resilient means, and a collar shiftable on the hub and engageable with cam surfaces on the opposite ends of the fingers to rock the same, the fingers fulcruming against the keyways during the releasing movement.

3. In a clutch, the combination of a hub having longitudinal keyways spaced around and opening radially outward thereof and an annular friction member, a second friction member journaled on the hub in coacting relation to the annular member, an annular, pressure plate having teeth fitting into the keyways and shiftable to frictionally grip the members, an annular, backing plate on the hub spaced and held against axial movement away from the pressure plate, a rubber ring compressed between the plates and acting to shift the pressure plate to gripping position, and means for releasing the members comprising a release finger rockable in each keyway and having one end engageable with the adjacent pressure plate tooth in a direction to further compress the resilient means and a cam surface at the opposite end, and a collar shiftable on the hub and engageable with the cam surfaces to rock the fingers, the fingers fulcruming against the keyways during the releasing movement and fitting within slots provided in the collar to prevent rotation thereof relative to the hub.

4. In a clutch, the combination of a hub having longitudinal keyways spaced around and opening radially outward thereof and an annular friction member, a second friction member journaled on the hub in coacting relation to the annular member, an annular, pressure plate having teeth fitting into the keyways and shiftable to frictionally grip the members, an annular, backing plate on the hub spaced and held against axial movement away from the pressure plate, a rubber ring compressed between the plates and acting to shift the pressure plate to gripping position, means for releasing the members comprising a release finger rockable in each keyway and having one end engageable with the adjacent pressure plate tooth in a direction to further compress the resilient means and a cam surface at the opposite end and a collar shiftable on the hub and engageable with the cam surfaces to rock the fingers, the fingers fulcruming against the keyways during the releasing movement, and a stop provided on each finger for limiting the releasing movement of the collar.

5. In a clutch, the combination of a hub having longitudinal keyways spaced around and opening radially outward thereof and an annular friction member, a second friction member journaled on the hub in coacting relation to the annular member, an annular, pressure plate having teeth fitting into the keyways and shiftable to frictionally grip the members, an annular, backing plate on the hub spaced and held against axial movement away from the pressure plate, a rubber ring compressed between the plates and acting to shift the pressure plate to gripping position, means for releasing the members comprising a release finger rockable in each keyway and having one end engageable with the adjacent pressure plate tooth in a direction to further compress the resilient means and a cam surface at the opposite end and a collar shiftable on the hub and engageable with the cam surfaces to rock the fingers, the fingers fulcruming against the keyways during the releasing movement, and other surfaces on the collar and fingers arranged to coact when the collar is in fully released position, said last named surfaces being disposed substantially parallel to the clutch axis whereby the extending action of the resilient means maintains the collar in release position.

LLOYD J. WOLF.

REFERENCES CITED

The following references are of record in the file of this patent:

UNITED STATES PATENTS

| Number | Name | Date |
| --- | --- | --- |
| 890,810 | Stacks | June 16, 1908 |
| 1,407,384 | Crowley | Feb. 21, 1922 |
| 1,450,202 | Crowley | Apr. 3, 1923 |
| 1,985,422 | Pearmain | Dec. 25, 1934 |
| 2,070,065 | Pearmain | Feb. 9, 1937 |
| 2,174,240 | Glenney | Sept. 26, 1939 |
| 2,287,608 | French | June 23, 1942 |
| 2,367,390 | Firth et al. | Jan. 16, 1945 |

FOREIGN PATENTS

| Number | Country | Date |
| --- | --- | --- |
| 134,695 | Germany | Sept. 30, 1902 |